United States Patent

[11] 3,607,062

| [72] | Inventor | Richard D. Sudduth |
| | | Cleveland Heights, Ohio |
| [21] | Appl. No. | 834,359 |
| [22] | Filed | June 18, 1969 |
| [45] | Patented | Sept. 21, 1971 |
| [73] | Assignee | Marathon Oil Company |
| | | Findlay, Ohio |

[54] PROCESS AND APPARATUS FOR THE FLUIDIZED CALCINING OF COKE
5 Claims, 1 Drawing Fig.

[52] U.S. Cl. ............................................. 23/209.9,
201/17, 263/52, 23/284
[51] Int. Cl. ............................................. C01b 31/02,
C10b 57/00
[50] Field of Search ....................................... 23/209.9,
277, 284; 201/17; 263/52; 252/417, 419

[56] References Cited
UNITED STATES PATENTS

| 2,738,316 | 3/1956 | Metrailer | 201/17 |
| 3,130,133 | 4/1964 | Louenstein | 201/17 |
| 3,271,268 | 9/1966 | Allred | 201/17 |
| 3,369,871 | 2/1968 | Hardy et al. | 23/209 9 |

OTHER REFERENCES
Kirk-Othmer Encyclopedia of Chemical Technology, 2 nd Ed., Vol. 4, 1964, pages 169- 171

*Primary Examiner*—Edward J. Meros
*Attorneys*—Joseph C. Herring, Jack L. Hummel and Richard C. Willson, Jr.

ABSTRACT: Controlled calcination of coke is accomplished by feeding raw coke, together with controlled amounts of oxygen and carbon monoxide, to maintain a calcining temperature in the range of from about 1,600° to about 3,200° F., and thereafter reducing the velocity of the gases which have fluidized the coke so as to separate the coke from said gases, preferably in a manner which permits the separation of various particle size fractions of the calcined coke.

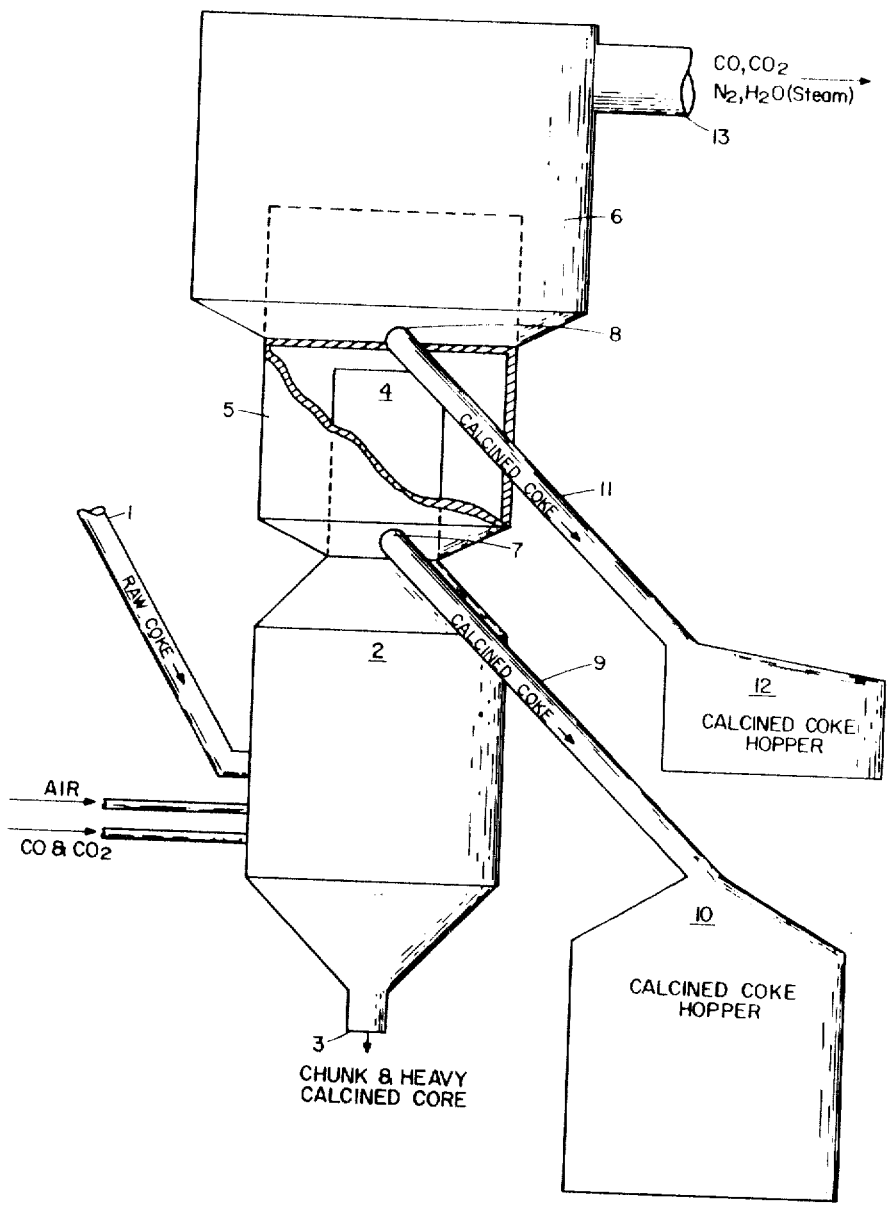

3,607,062

PROCESS AND APPARATUS FOR THE FLUIDIZED CALCINING OF COKE

BACKGROUND OF THE INVENTION

1. Field of the Invention

The present invention relates to the general field of calcining of coke, particularly as may be found in U.S. Pat. Office Classes 196 (Mineral Oils: Apparatus; Dewaxing, Solvent Extraction, Refining, Combined Vaporizing and Condensing, Vaporizing Condensing Miscellaneous); and 263 (Heating; Miscellaneous, Articles, Furnaces, Receptacles, Heat Screens, Checker Bricks, and Processes).

2. Description of the Prior Art

Continuous fluidized calcination has been accomplished by a variety of processes and apparatus including that of U.S. Pat. No. 2,300,042, which utilizes flow through bags to filter out the calcined particles from the gas stream; U.S. Pat. No. 2,502,953, which relates to the removal of volatile hydrocarbons from catalysts prior to decoding; U.S. Pat. No. 3,112,101, which relates to cleaning and cooling of gases before they pass through the suction fan utilized to convey the gas-particle mixture through the vertically calcining kiln; U.S. Pat. No. 790,162, which relates to the drying of moist material, and U.S. Pat. No. 2,659,587, which relates to a curved wall apparatus used for heat-treating material which does not contain volatile combustible matter.

SUMMARY

General Statement of the Invention

While many types of apparatus and processes have been utilized or proposed for the heat treatment of various materials, none have exhibited in combination the advantages of the present invention, including, among others; the ability to maintain very close control of the removal of volatile materials, the ability to control closely, and to minimize, combustion of the carbon which is the desired product of the present invention; sufficient simplicity of apparatus to permit the construction of the ceramic-lined e.g., brick-lined, calcining chamber necessary for the containing of temperatures sufficient to adequately calcine coke, provision for separating a variety of sizes of calcined coke if desirable, low capital investment per unit of productive capacity due to the simplicity and speed of materials handling.

Utility of the Invention

Raw coke is available in large quantities from coal and from petroleum sources. Petroleum coke can be produced by either the delayed process in which petroleum residuum is heated, e.g., to 1,000° F. and then permitted to polymerize in a large cooling chamber called a "coke drum," or by the fluidized method in which coke is continuously formed from petroleum residuum as described in Methods of A. Vorhies, Fluid Coking, Proceedings of the Fourth World Petroleum Congress, Sec. III/F, page 360, and Petroleum Processing, Mar. 1956, pp 135–137. Coke is useful as a filling or reinforcing agent in various polymeric compositions, e.g. vulcanizable elastomers, and is particularly useful for the preparation of graphite. In these uses, particularly in the production of graphite, the volatile combustible materials, e.g., those boiling below 2,800° F., are objectionable impurities. Therefore, raw coke must, for most uses, be calcined to remove at least a major portion of the volatile content. This is generally accomplished by heating the raw coke to temperatures in the range of from about 1,600° to about 3,200° F., more commonly in the range of from about 2,000° to about 2,800° F., and most commonly in the range of from about 2,350° to about 2,700°. This calcining process increases the "grain density" of the coke and speeds the relatively expensive process of graphitizing.

BRIEF DESCRIPTION OF THE DRAWING

The drawing is a schematic diagram of the apparatus of the present invention.

DESCRIPTION OF THE PREFERRED EMBODIMENTS

Starting Materials

The preferred starting materials for the present invention are raw petroleum coke, delayed or fluidized, with delayed being most preferred, containing from about 1 to about 16 percent, more preferably 2 to 12 percent by weight, volatile combustible matter (that is those combustibles which can be burned determined according to ASTM Test 271-58), having a particle size averaging from about 0.001 to about 1.0, more preferably from 0.005 to about 0.5, and most preferably from about 0.01 to about 0.1 inches.

The gases utilized in the present invention are oxygen, most conveniently in the form of air; carbon monoxide/carbon dioxide mixture available generally from refinery operations such as stock gases emitted by a conventional fluidized coker, and desulfurized flue gas from refinery furnaces; and various inert gases which may be utilized to maintain the required gas velocities through the various chamber. Hydrocarbon fuel e.g., in the form of methane, ethane, butane, propane, or other gaseous hydrocarbons, or in the form of higher molecular weight hydrocarbons can be injected into the apparatus to provide available heat where necessary. This can be readily accomplished by either vaporizing the auxiliary fuel and mixing it with the gas stream entering the calcining chamber or by directly spraying or otherwise injecting the fuel into the calcining chamber. However, in most cases, particularly when the volatile content of the material is relatively high, the close control permitted by the present invention allows the calcining of the material to the desired reduction in volatile combustible content without the use of auxiliary fuels.

Oxygen will generally be required in amounts of from about 1 to about 3 pounds of oxygen per pound of volatile combustible matter in the coke. The most common volatile combustible matter is a mixture of approximately 50 weight percent $H_2$ and about 50 weight percent $CH_3$ which requires roughly two pounds of oxygen to oxidize one pound of this mixture. Noncombustible volatile matter is usually found in coke and is driven off during the process of the present invention, This noncombustible volatile matter is often in the form of oxygen and this oxygen can be taken into account when determining the required rate of injection of oxygen into the furnace.

The $CO/CO_2$ mixture will generally be injected at a rate sufficient to cause the upward movement of the fluidized particles referred to above. While the primary consideration controlling the ratio of CO to $CO_2$ is the control of temperature within the calcining chamber (increasing the CO increases the temperature), in general, the $CO/CO_2$ mixture will contain from about 20 to about 80, more preferably from about 30 to about 70 and most preferably from about 30 to about 60 percent by volume CO.

All of the feeds, i.e., the coke and the gases may be mixed together prior to entry into the calcining chamber or the mixing may occur in the calcining chamber. For purposes of control, it is especially preferred that the raw coke, air, and $CO/CO_2$ mixture each be injected separately into the calcining chamber.

Temperature

The temperature within the calcining chamber will average from about 1,600° to about 3,400 ° F., and more preferably from about 2,000° to about 2,900° F., and most preferably from about 2,300° to about 2,700° F. It is an important aspect of the invention that this temperature is controlled by controlling the ratio of CO to $CO_2$ and also by controlling the amount of the $CO/CO_2$ mixture fed per hour. In general, the raw coke feed will be relatively constant for each particular volatile content. The flow of oxygen will then be stoichiometrically related to the rate of removal of volatiles from the raw coke necessary to process the amount of coke fed to the desired lower volatile content. The $CO/CO_{0/o2}$ ratio will then be varied in order to maintain the desired residence time, to permit the proper amount of fluidization (sufficient to maintain the desired residence time while causing particles which can be substantially calcined during the residence time to be moved upwardly and causing particles too large to be calcined during that residence time to move downwardly and exit from the lower portion of the calciner for recycle or other use). Table 1 gives the preferred and more preferred ranges of feed rates for the raw coke and gases.

Pressure

Since the present process involves the expulsion of volatile materials, increase in pressure is not desirable. Normally, for reasons of economy, the apparatus will be operated essentially at atmospheric pressure, However, minor deviations from this can be permitted where necessary.

Residence Time

The residence time in the calcining chamber will generally be from about 0.1 to about 120, more preferably from about 0.5 to about 40 and most preferably from about 5 to about 20 minutes.

EXAMPLE I

The drawing shows an apparatus of the present invention in schematic form. Raw coke is conveyed through inlet pipe 1, air through inlet pipe $b$, and $CO/CO_2$ mixture through inlet pipe $c$ into a calcining chamber having an interior diameter of about 10 feet and a interior height of about 30 including 5-foot-high truncated-conical ends at the top and bottom.

A bottom outlet 3 is provided for oversize coke. The upper portion of the calcining chamber connects with a vertically extending conduit 4 having interior diameter of about 2 feet and a height of about 6 feet. Conduit 4 extends upwardly into separating chamber 5 which has a diameter of about 12 feet and a height of about 10 feet. The upper portion of separating chamber 5, in turn, extends into a second separating chamber 6 having an interior diameter of about 15 feet and a height of about 10 feet.

Separatory chambers 5 and 6 have outlets 7 and 8, respectively, in their bottom portions. Calcined coke exits from outlet 7 and flows through pipe 9 into calcined coke hopper 10. Similarly, somewhat finer calcined coke exits from outlet 8 and flows through pipe 11 into calcined coke hopper 12.

A raw delayed petroleum coke having a volatile combustible content of about 12 percent by weight based on the total weight of the raw coke, an average particle size of about 0.2-inch diameter, and having about 10 weight percent of particles above 0.6-inch diameter is fed to a calcining chamber at a rate of about 200,000 pounds per hour. The material is fluidized in a conventional air-conveyor system and is injected into the calciner without preheating.

Air (containing about 21 percent oxygen) is injected into the calcining chamber separately at a rate of about 2 pounds of oxygen per pound of volatile combustible material in the raw coke.

Carbon monoxide/carbon dioxide mixture is injected at a rate sufficient to fluidize the particles having the average diameter (0.2 inches) so that they will move upwardly through the reaction chamber at a rate of about 0.8 feet/minute. For the approximately 25-foot vertical distance between the raw coke inlet and the top of the calcining chamber described below, this is equivalent to a residence time of about 20 minutes.

It should be noted that particles smaller than the average diameter will move upwardly at a rate greater than the above rate for the average particle. Therefore, the residence time of small particles will be markedly less than that for average particles and the residence time for particles which are above average in size will move upwardly through the chamber at a slower than average rate thus exposing them to a longer than average residence time. Thus, residence time is inversely proportional to particle size. For calcination to a given volatile content, the required residence time is also inversely proportional to particle size. Thus the present invention automatically compensates to a large extent for variations in particle size and insures a nearly optimum residence time for each of the particles within the size range which moves upwardly through the calcining chamber. This feature of the invention minimizes particles having excessive volatile content due to insufficient residence time and also minimizes loss of valuable carbon due to excessive residence time and the resulting oxidation of carbon values generally encountered when smaller particles are conventionally calcined.

Particles which are larger than about 0.6 inches are incapable of being fluidized by the gas velocity in the calcining chamber, and therefore descend through the chamber and exit through bottom outlet 3. Heavy calcined longer is used for other purposes or may be reduced in size by crushing or grinding and recycled back to the calciner with other incoming raw coke.

As the calcined coke/gas mixture moves upward through conduit 4 it meets larger diameter separation chamber 5. As a result of the lower average velocity in separation chamber 5, a portion of the larger particles can no longer be fluidized and move downward through chamber 5 to its outlet 7, then through pipe 9 into calcined coke hopper 10. This portion of the calcined coke contains about 0.7 percent by weight volatile matter.

Similarly, a second reaction of the coke descends through second separation chamber 6 and exits through its outlet 8 into pipe 11 and finally into calcined coke hopper 12. The second fraction is, of course somewhat smaller in diameter than that collected in hopper 10 and contains an average of 1 percent by weight volatile matter.

In the particular embodiment shown above, virtually all of the calcined coke is collected in hoppers 10 and 12 so that no appreciable amount remains in the gases exiting through outlet 13 in the upper portion of separatory chamber 6. However, it should be understood that a number of additional separatory chambers, each having a larger cross-sectional area to gas flow than the preceding, can be connected in the manner employed above for the collection of chambers 5 and 6.

Coke may be recycled back through one or more stages of the calciner if it is not sufficiently calcined, e.g., during start up. Suitable coolers, e.g., spiral water-cooled heat exchangers can be provided prior to each hopper, if necessary.

It is an important aspect of the present invention that a number of fractions having different average particle diameters may be collected in hoppers corresponding to those exemplified by hoppers 10 and 12 of the drawing. These different particle sizes may be employed for different end uses, and because of the uniformity of their size and of their volatility, will frequently command premium prices on existing markets.

Modifications of the Invention

It should be understood that the invention is capable of a wide variety of modifications and variations in addition to those described above. These will be made apparent to those skilled in the art by a reading of the specification and all such are to be included within the spirit of the claims appended hereto.

What is claimed is:

1. A process for the production of calcined coke comprising in combination, the steps of:
   a. Feeding to a vertically extending calcining chamber raw coke containing particles having average particle size of from 0.001 to about 1.0 inches, the raw coke containing about 1 to about 16 percent by weight of volatile combustible matter based on the weight of the raw coke, said volatile combustible matter being removable by heating said coke to from about 1,600° to about 3,200° F., from about 1 to about 4 pounds of oxygen per pound of said volatile combustible matter; and sufficient $CO/CO_2$ mixture to fluidize at least a portion of said coke, from about 20 to about 80 percent by volume of carbon monoxide;
   b. Controlling the input of said oxygen and said carbon monoxide so as to maintain the temperature in said calcining chamber at from about 1,800° to about 3,200° F.;

c. Controlling the flow of said carbon dioxide so as to fluidize at least 2 percent by weight of said raw coke and cause it to move upward through said calcining chamber and so that the total gas flow through said calcining chamber is sufficiently low that coke particles having an average particle size of above about 1.0 inches descend through said calcining chamber and exit through the bottom thereof;

d. Maintaining residence time of said upward-moving coke within said calcining chamber at from about 0.1 to about 120 minutes;

e. Causing said upward-moving coke to exit from an upper point in said calcining chamber through a vertically extending conduit;

f. Causing said particles to exit from said vertically extending conduit into a first separating chamber having a larger cross-sectional area to gas flow than said calcining chamber whereby the gas hourly space velocity of said second chamber is less than the gas hourly space velocity of gases passing through said calcining chamber so that at least a portion of said coke moves downward through said first separating chamber and at least a portion of said coke moves upward with the gases moving through said first separating chamber;

g. Causing at least a portion of said downwardly moving coke to exit from a point in the lower portion of said first separatory chamber.

2. The process of claim 1 wherein the cross-sectional area of said vertically extending conduit is substantially less than the diameter of said calcining chamber.

3. The process of claim 1 wherein the upper portion of said first separatory chamber extends upwardly through the lower portion of a second separatory chamber having a cross-sectional area to gas flow larger than that of said first separatory chamber and wherein at least a portion of the coke moves downward through said second separatory chamber and exits from a point in the lower portion thereof.

4. The process of claim 1 wherein the coke exiting from said first separatory chamber contains not more than about 1 percent by weight of said volatile combustible matter based on the total weight of the coke exiting from said separatory chamber.

5. Apparatus for the calcining of coke comprising in combination;

a. A vertically extending calcining chamber having inlet means for admitting raw coke having an average particle size of from about 0.001 to about 1.0, oxygen, carbon monoxide and carbon dioxide, said chamber having an exit for relatively large coke particles in its lower portion, said calcining chamber having an exit for relatively small coke particles and gases in its upper portion;

b. An upwardly extending conduit connected to said outlet in the upper portion of said calcining chamber, said conduit having a vertical extent;

c. A first separatory chamber into the lower portion of which said conduit extends, said separatory chamber having a cross-sectional area to gas flow greater than that of said calcining chamber; and having an outlet for calcined coke in its lower portion;

d. A second separating chamber into the lower portion of which said first separatory chamber extends, said second separatory chamber having a higher cross-sectional area to gas flow than said first separatory chamber, said second separatory chamber having a gas outlet and having an outlet for calcined coke in its lower portion.

PO-1050
(5/69)

UNITED STATES PATENT OFFICE
CERTIFICATE OF CORRECTION

Patent No. 3,607,062      Dated Sept. 21, 1971

Inventor(s) Richard D. Sudduth

It is certified that error appears in the above-identified patent and that said Letters Patent are hereby corrected as shown below:

Col. 1, line 20:     "decoding" should read --decoking--

Col. 2, line 73:     "$CO/CO_{o/o2}$" should read --$CO/CO_2$--

Col. 4, line 13:     "longer"     should read --coke--

Col. 4, line 25:     "reaction"     should read --fraction--

Signed and sealed this 25th day of April 1972.

(SEAL)
Attest:

EDWARD M. FLETCHER, JR.              ROBERT GOTTSCHALK
Attesting Officer                      Commissioner of Patents